United States Patent [19]
Bouchnik

[11] 3,881,671
[45] May 6, 1975

[54] DETACHABLE CABIN AIRCRAFT

[76] Inventor: Joseph Bouchnik, Moshav Mismeret, Gush Tel Mond, Israel

[22] Filed: Apr. 23, 1973

[21] Appl. No.: 353,842

[30] Foreign Application Priority Data
Apr. 21, 1972  Israel..................... 39260

[52] U.S. Cl.................................. 244/140; 244/46
[51] Int. Cl............................................. B64d 25/08
[58] Field of Search ........... 244/2, 43, 46, 120, 138, 244/140, 141; 102/49.4, 49.5

[56] References Cited
UNITED STATES PATENTS

| | | | |
|---|---|---|---|
| 2,683,574 | 7/1954 | Peterson | 244/46 |
| 2,702,680 | 2/1955 | Heinemann et al. | 244/140 |
| 2,743,887 | 5/1956 | Fiedler | 244/43 |
| 2,977,080 | 3/1961 | Zborowski | 244/140 |
| 3,087,692 | 4/1963 | Lowry | 244/46 |
| 3,093,348 | 6/1963 | Schelp et al. | 102/49.5 |
| 3,489,375 | 1/1970 | Tracy | 244/46 |
| 3,534,924 | 10/1970 | Spencer et al. | 244/46 |
| 3,572,617 | 3/1971 | Ricard | 244/46 |
| 3,662,978 | 5/1972 | Hollrock | 244/141 |
| 3,730,458 | 5/1973 | Haberkorn | 244/43 |

FOREIGN PATENTS OR APPLICATIONS

| | | | |
|---|---|---|---|
| 2,049,643 | 4/1971 | Germany | 244/46 |
| 831,978 | 4/1960 | United Kingdom | 244/2 |
| 75,013 | 2/1961 | France | 244/140 |

OTHER PUBLICATIONS

Aviation Week, "Navy's New Exit Cabin," Apr. 3, 1950, p. 28.
Flight International, "F-111 Escape System," Oct. 3, 1963, p. 591.

*Primary Examiner*—Trygve M. Blix
*Assistant Examiner*—Galen L. Barefoot
*Attorney, Agent, or Firm*—Benjamin J. Barish

[57] ABSTRACT

A delta-wing air craft comprises a main wing and a pilot's cabin section forwardly of the main wing, the pilot's section being detachable from the main wing and including a pair of auxiliary wings pivotably mounted about a vertical axis of the aircraft. The auxiliary wings form the apex of the delta-wing in the attached position of the cabin section, and are pivotable to a deployed position when the cabin section is detached to provide a glider wing surface for the detached cabin section.

8 Claims, 18 Drawing Figures

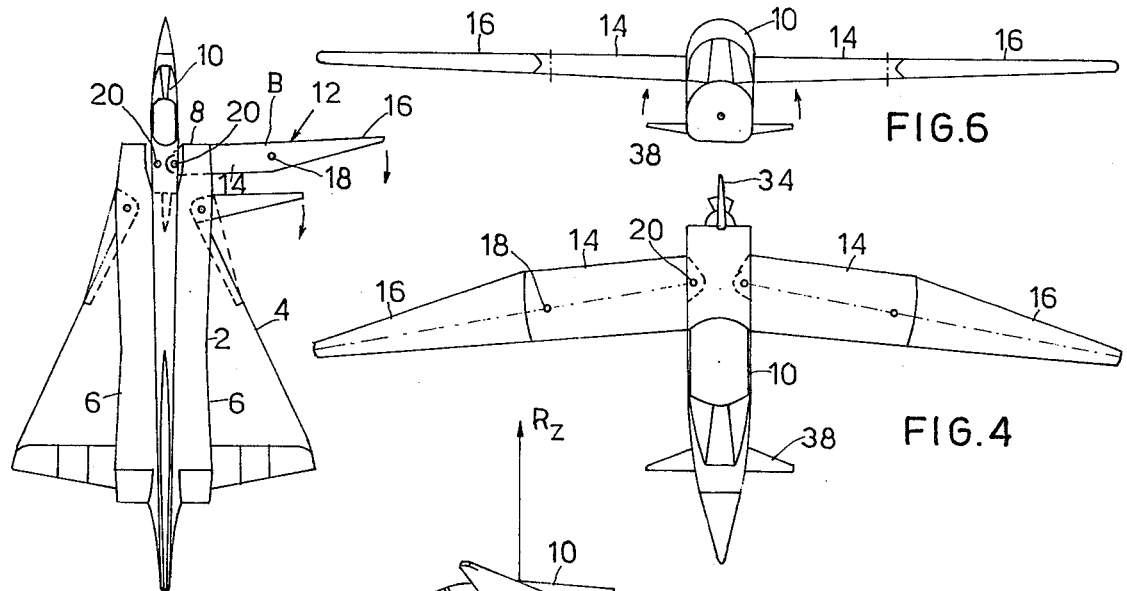
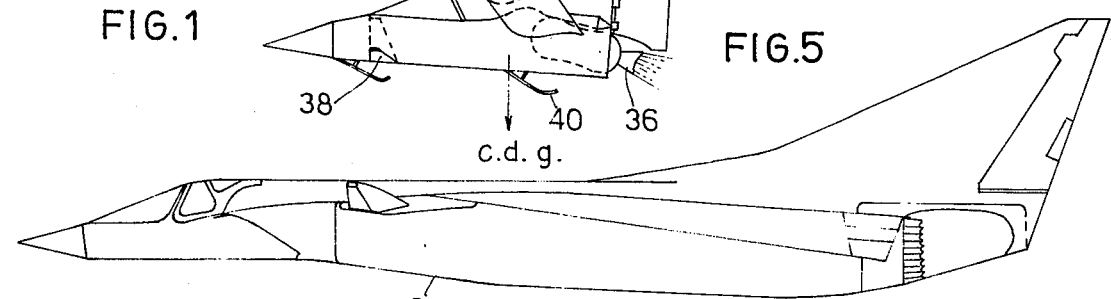
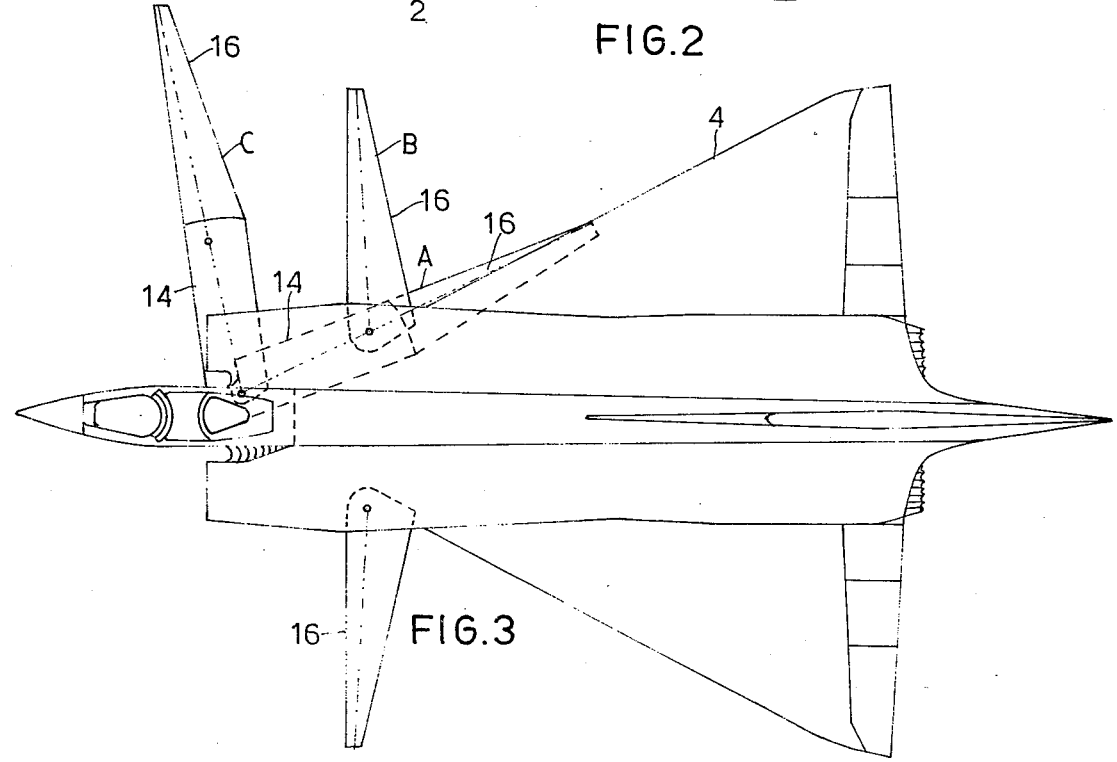

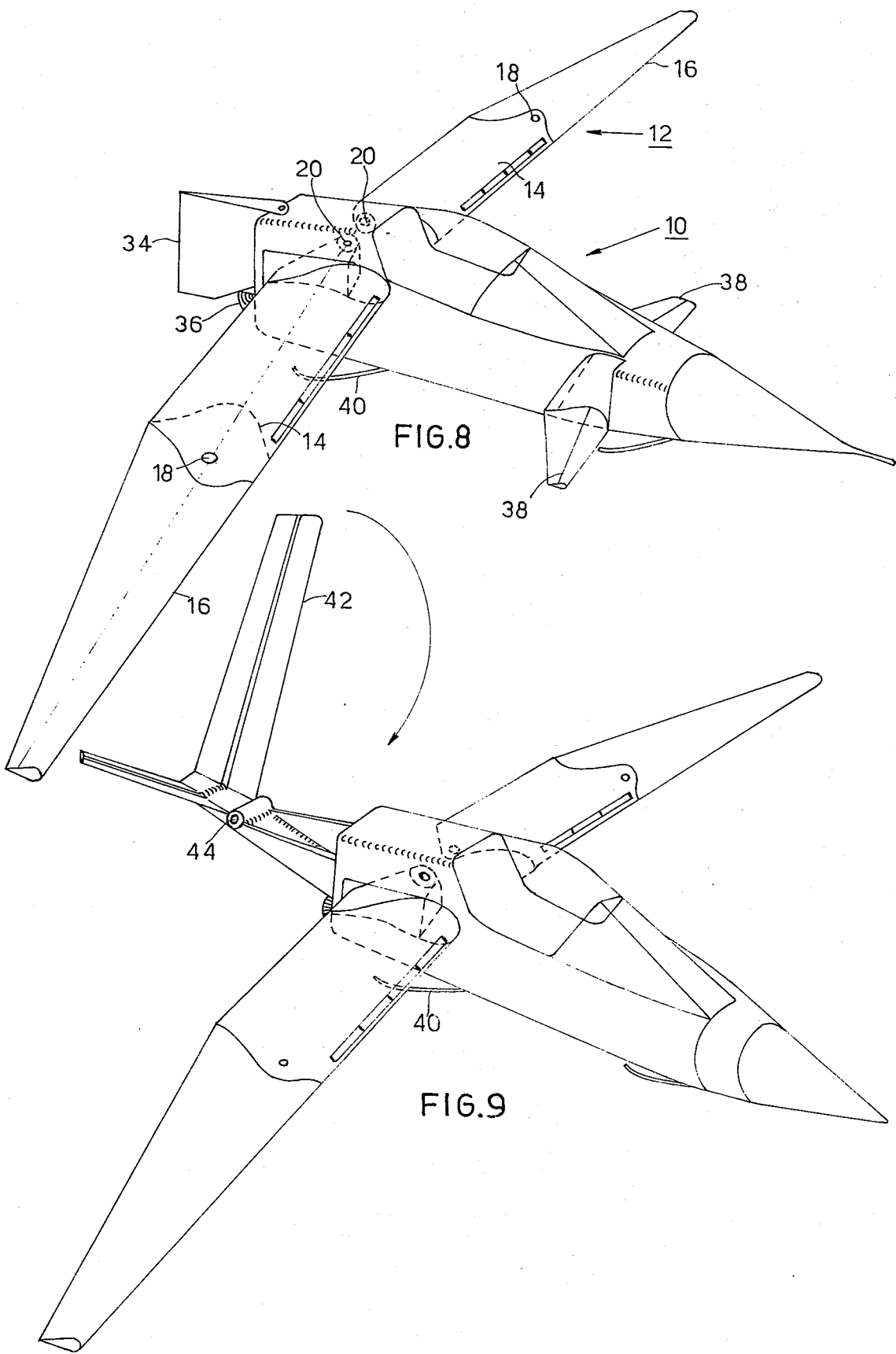

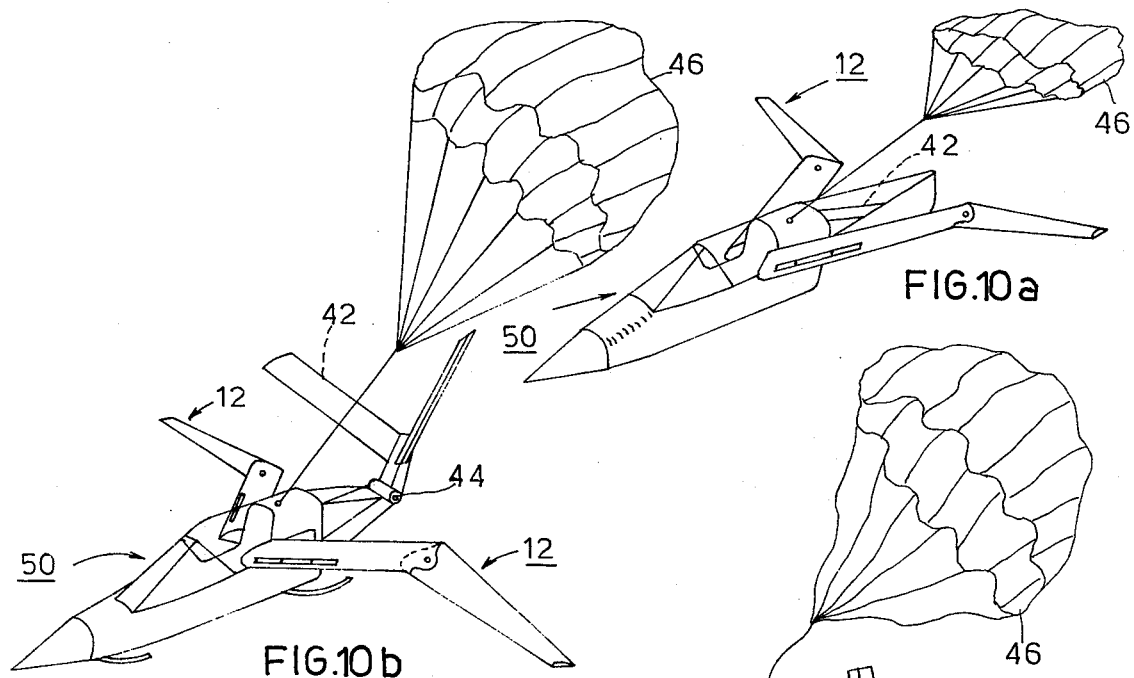
FIG.10a
FIG.10b
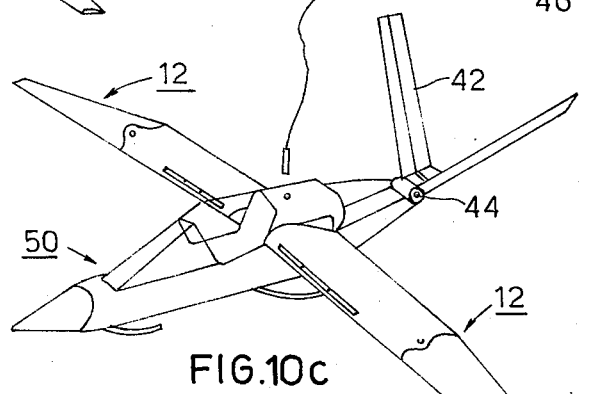
FIG.10c
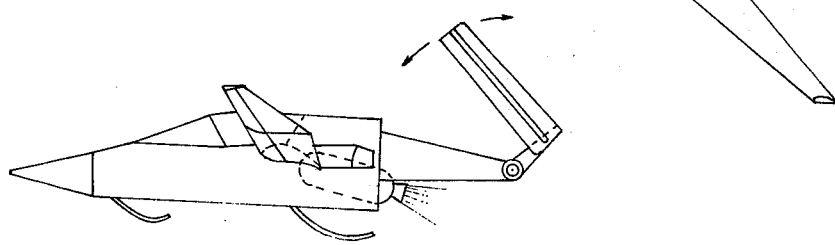
FIG.10 b'
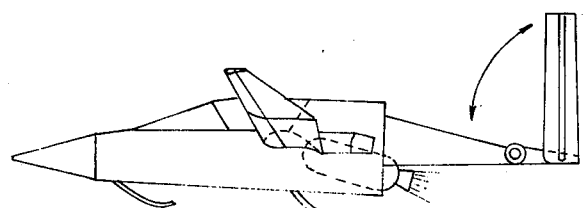
FIG.10 c'

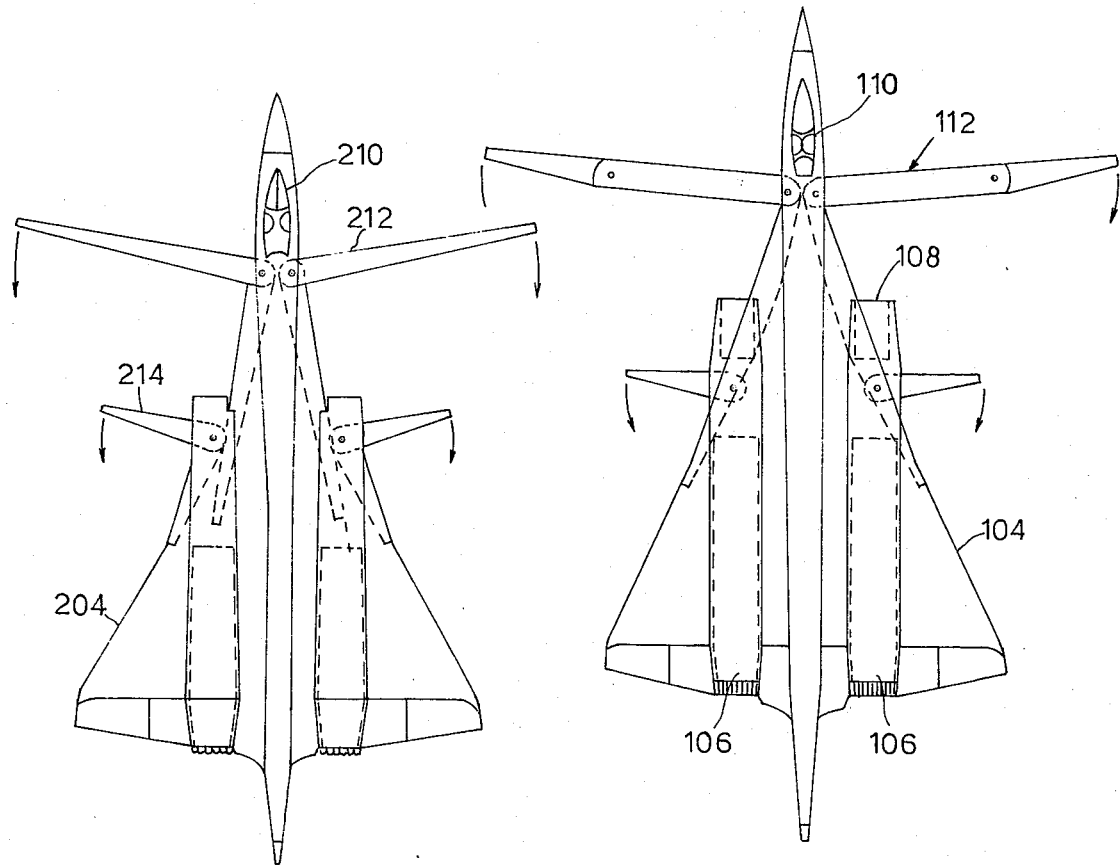
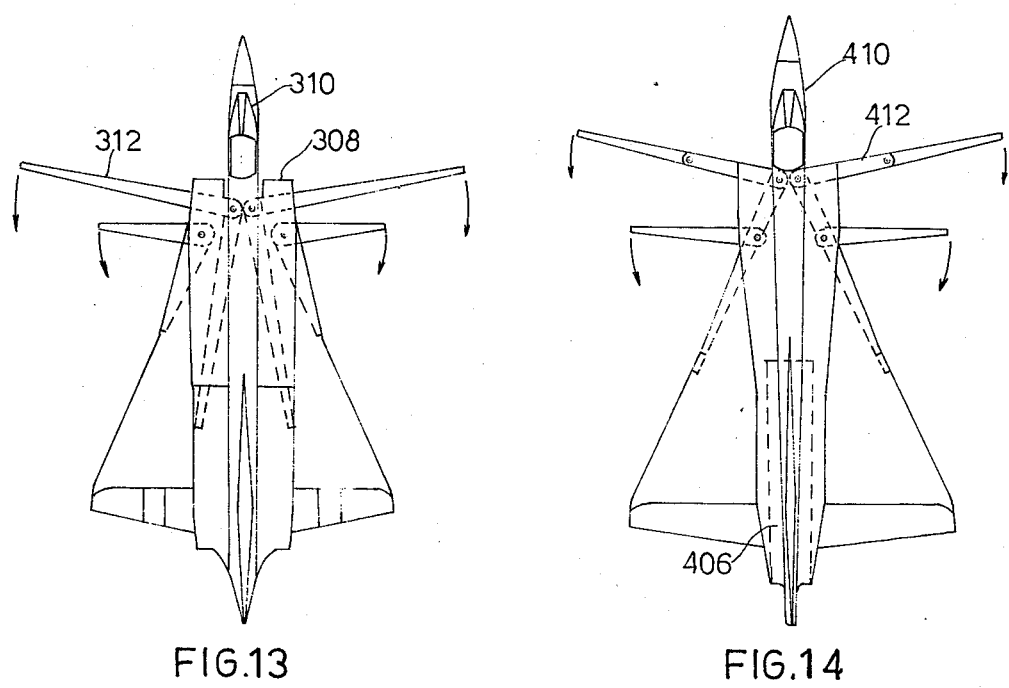

3,881,671

DETACHABLE CABIN AIRCRAFT

BACKGROUND OF THE INVENTION

The present invention relates to aircraft having a pilot's cabin section which may be detached from the remainder of the aircraft at time of emergency to save the crew.

Aircraft including a detachable cabin section, and a parachute to provide a soft landing for the detached cabin section, are known. Such aircraft, however, have little capability of maneuvering the descent of the detached cabin section so as to land at a distant point in case the aircraft is downed over enemy territory.

SUMMARY OF THE INVENTION

An object of the present invention is to provide an aircraft having the foregoing capability.

According to the present invention, there is provided on aircraft comprising a main delta-wing section and a pilot's cabin section forward of the main delta-wing section, the pilot's section being detachable from the main delta-wing section. The cabin section includes a pair of auxiliary wings substantially coplanar with the main delta-wing section and pivotably mounted about a vertical axis of the aircraft from a retracted position when the cabin section is attached to the main delta-wing section, to a deployed position when the cabin section is detached from the main delta-wing section. When the cabin section is attached, the auxiliary wings, in the retracted position, are pivoted rearwardly and form the apex and leading edge of the main delta-wing section; and when the cabin section is detached, the auxiliary wings are pivoted forwardly to their deployed position and provide an increased glider wing surface for the detached cabin section.

The invention is particularly useful in the delta-wing aircraft described in my copending application Ser. No. 79,740 filed Oct. 12, 1970. When embodied in such an aircraft, the above-mentioned auxiliary wings each includes two sections pivotably mounted to each other about a vertical axis of the aircraft to form foldable inner and outer sections, now U.S. Pat. No. 3,738,595. The outer sections are movable from a retracted position at cruising speeds to a deployed position at lower speeds or at the time the cabin is detached from the aircraft. The inner sections are movable from a retracted position at cruising or lower speeds to a deployed position at the time the cabin is detached from the aircraft.

Such an aircraft combines the capability of providing a maneuverable detached cabin section with the capability of increasing lift and horizontal stabilization of the aircraft itself during low speeds or high elevation.

Further features and advantages of the invention will be apparent from the description below.

BRIEF DESCRIPTION OF THE DRAWINGS

The invention is herein described, somewhat diagramatically and by way of example only, with reference to several preferred embodiments thereof illustrated in the drawings, wherein:

FIG. 1 is a plan view of one form of delta-wing aircraft including a detachable pilot's cabin section constructed in accordance with the invention;

FIG. 2 is a side elevational view of the aircraft of FIG. 1;

FIG. 3 is a partial plan view of the aircraft of FIG. 1 illustrating the three positions of the auxiliary wings;

FIG. 4 is a plan view of the detached cabin section with the auxiliary wings fully deployed;

FIG. 5 is a side elevational view of the detached cabin section of FIG. 4;

FIG. 6 is a front elevational view of the detached cabin section of FIG. 4;

FIG. 8 is an enlarged perspective view of the detached cabin section of FIGS. 4–6;

FIG. 9 is a perspective view of a modified detachable cabin section including a foldable tail;

FIGS. 10a–10c illustrate the various stages in the detachment of the foldable-tail aircraft of FIG. 7, FIGS. 10b' and 10c' being side elevational view of the aircraft as illustrated in FIGS 10b and 10c, respectively; and FIGS. 11–14 illustrate further variations.

DESCRIPTION OF THE PREFERRED EMBODIMENTS

Figure 7:
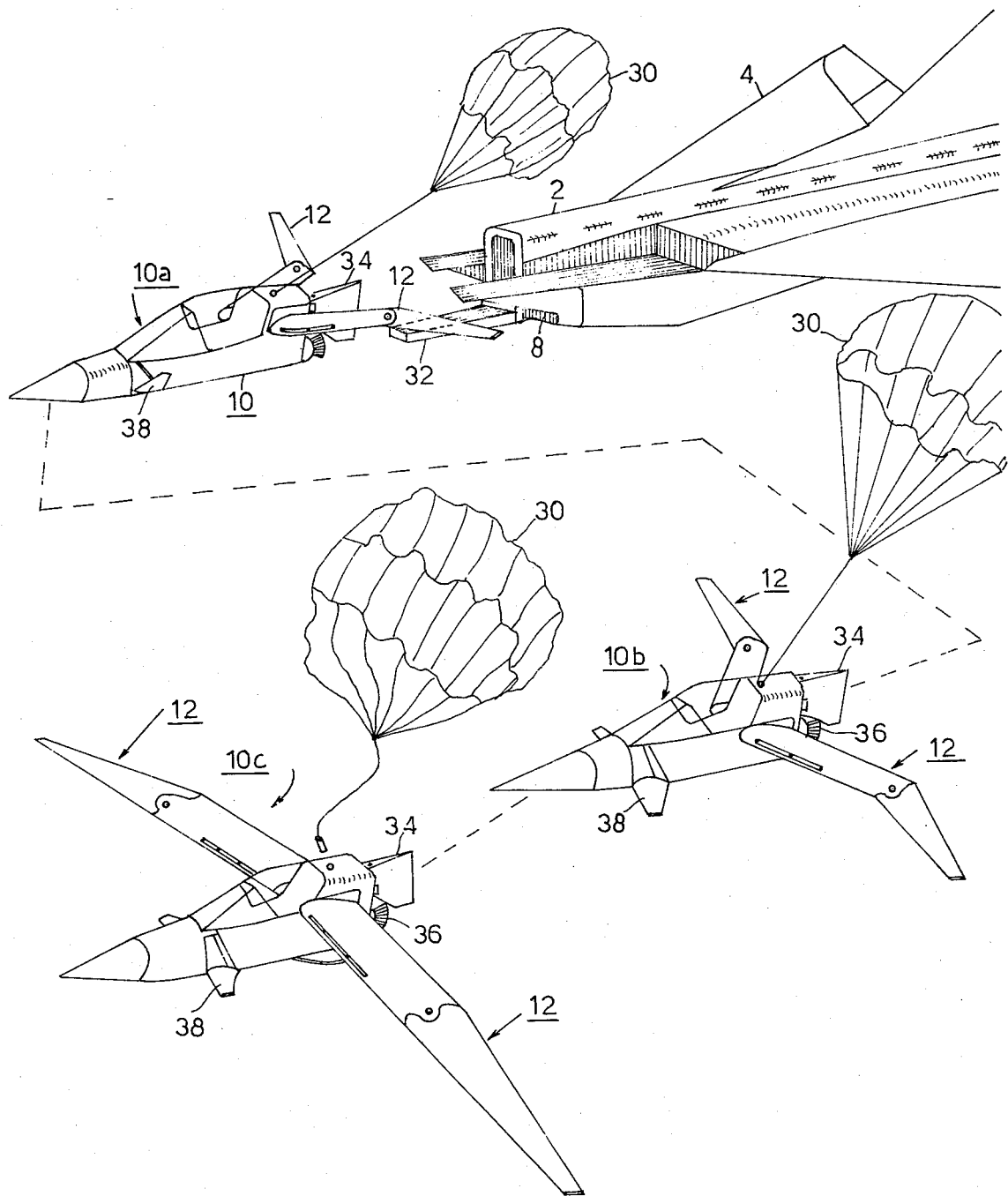
FIG. 7 illustrates the various stages in the detachment of the cabin section.

The aircraft illustrated in FIGS. 1–7 comprises a fuselage 2, a main delta-wing section 4 fixed to the fuselage a pair of jet engines 6 mounted in the fuselage, and a pair of air intakes 8 carried forwardly of the delta-wing.

According to the invention, the pilot's cabin section 10 is made detachable from the fuselage 2, and includes a pair of auxiliary wings 12 substantially coplanar with the main delta-wing section 4. Each of these wings comprises two sections, namely an inner section 14 and an outer section 16 pivotably mounted thereto about vertical axis 18 of the aircraft. In addition, the complete auxiliary wings are each pivotable about vertical axes 20 at the inner end of the inner sections 14.

Each of the auxiliary wings 12 may thus assume any one of three positions as illustrated with respect to the upper auxiliary wing in FIG. 3, namely: a fully retracted position A wherein both of the sections 14 and 16 are retracted and form the apex and leading edge of the delta-wing 4; a partially deployed position B, in which inner section 14 is retracted but the outer section 16 is deployed; and a fully deployed position C, wherein both sections 14 and 16 are pivoted forwardly and are fully deployed. The auxiliary wings are caused to assume position A during normal flight at cruising speeds, in which case the auxiliary wings form the apex and leading edge of the delta-wing as described above; they are caused to assume position B during low speed or high altitude flight to increase the lift, as described in my copending patent application Ser. No. 79,740 now U.S. Pat. No. 3,738,595; and they are caused to assume position C when the cabin section 10 is detached (see FIGS. 4–6) to provide a glider wing surface for the detached cabin section to enable it to be maneuvered to a desired landing spot.

FIG. 7 illustrates the various stages in the separation of the cabin section from the main aircraft.

Condition 10a illustrates the condition of the cabin section 10 immediately after it has been detached from the aircraft, wherein a parachute 30 is first deployed. It will be seen that as soon as the cabin section 10 has been detached, parachute 30 carried by the detached section is deployed to stabilize the detached section until the auxiliary wings 12 are fully deployed. The aircraft preferably includes a ramp 32 engageable with the bottom surface of the cabin section 10 during the attached condition of the latter, and guiding same during its detachment. The detachment may be effected by an explosive ejection means, such as are used for ejecting a pilot's capsule.

Condition 10b of the cabin section in FIG. 7 illustrates its condition during the deployment of the auxiliary wings 12; and condition 10c illustrates its condition when the auxiliary wings 12 have been fully deployed to provide a large glider wing surface for maneuvering the detached cabin section. FIG. 8 illustrates the detached cabin section with the auxiliary wings 12 fully deployed.

In the embodiment illustrated in FIGS. 7 and 8, the detached cabin section includes a rudder 34 for direction control during the gliding descent of the detached section. It may further include a rocket 36 to provide power for reclimbing in order to permit the pilot to better maneuver the detached section to a more desirable landing spot. Further, the cabin section may include a pair of pivotable front elevators 38 for longitudinal control, these elevators being pivotable about a horizontal axis of the aircraft (as shown by the arrows in FIG. 6) from a deployed horizontal position (shown in full lines in FIGS. 6–8) to a retracted vertical position flush against the cabin section (shown in broken lines in FIG. 5). In addition, the detachable cabin section includes landing skids 40.

FIG. 9 illustrates a variation in the detachable cabin section, wherein a foldable tail 42 is provided instead of the direction rudder 34. Tail 42 is of V-formation and is pivotably mounted about a horizontal axis 44 so that the tail may be folded against the cabin section when the latter is attached to the aircraft.

FIGS. 10a–10c illustrate the various stages in the detachment of the cabin section of FIG. 9. In FIG. 10a, the V-tail is folded against the cabin section, which is the condition of the tail when the cabin section is attached to the aircraft. FIG. 10a illustrates the beginning of the detachment, wherein the tail is still folded against the cabin section, and a parachute 46 is deployed immediately after detachment. In FIG. 10b (corresponding side elevational view being illustrated in FIG. 10b'), the tail is pivoted about axis 44; and in FIG. 10c (a corresponding side elevational view being illustrated in FIG. 10c'), the tail is fully deployed. In addition, the auxiliary wings 12 are also fully deployed, and therefore the parachute 46 may be detached.

The aircraft illustrated in FIG. 1 (and in FIGS. 2–9) is particularly useful as a multiple-role combat aircraft.

FIG. 11 illustrates the invention as embodied in a bomber aircraft in which the jet engines 106 and the air intakes 108 are mounted in the delta-wing 104. The detachable cabin section 110 and its auxiliary wings 112 are basically the same as illustrated in FIG. 1 and described above.

FIG. 12 illustrates another variation, in which the detachable pilot's cabin section 210 carries pivotable auxiliary wings 212 which are used only to enable the detached cabin section to descend as a glider. The main delta-wing 204 of the aircraft includes additional but separate auxiliary wings 214 which are deployable to increase lift and horizontal stabilization of the aircraft, as described in my copending patent application Ser. No. 79,740 now U.S. Pat. No. 3,738,595. It will be noted that in the attached condition of the pilot's cabin section 210, the auxiliary wings 212 are retracted and form the apex of the delta-wing 204.

FIG. 13 illustrates a further variation of the aircraft of FIG. 12, wherein the air intakes 308 are disposed forwardly of the auxiliary wings 312 of the detachable cabin section 310; and FIG. 14 illustrates a further variation of FIG. 1, wherein the aircraft has a single jet engine 406, the detachable cabin section and auxiliary wings being shown at 410 and 412, respectively.

Many other variations, modifications and applications of the illustrated embodiments will be apparent.

What is claimed is:

1. An aircraft comprising a main delta-wing section and a pilot's cabin section forwardly of the main delta-wing section, said pilot's cabin section being detachable from the main delta-wing section and including a pair of auxiliary wings substantially coplanar with the main delta-wing section and pivotably mounted about a vertical axis of the aircraft, said auxiliary wings being pivoted from a retracted position when the cabin section is attached to the main delta-wing section, to a deployed position when the cabin section is detached from the main delta-wing section, said auxiliary wings in the retracted position being pivoted rearwardly and forming the apex and leading edge of the main delta-wing section, said auxiliary wings in the deployed position being pivoted forwardly and providing an increased glider wing surface for the detached cabin section.

2. An aircraft according to claim 1, wherein said auxiliary wings each includes two sections pivotably mounted to each other about a vertical axis of the aircraft to form foldable inner and outer sections, the outer sections being movable from a retracted position at cruising speeds to a deployed position at lower speeds or at the time the cabin is detached from the aircraft, and the inner sections being movable from a retracted position at cruising or lower speeds to a deployed position at the time the cabin is detached from the aircraft.

3. An aircraft according to claim 1, wherein said aircraft includes a further pair of auxiliary wings carried by and pivotably mounted to the main delta-wing from a retracted position at cruising speeds to a deployed position at lower speeds.

4. An aircraft according to claim 1, wherein said detachable cabin section includes a parachute for stabilizing same when detached from the aircraft.

5. An aircraft according to claim 1, wherein said detachable cabin section further includes a rocket to provide power for reclimbing.

6. An aircraft according to claim 1, wherein said detachable cabin section further includes a rudder for direction control.

7. An aircraft according to claim 1, wherein said detachable cabin section further includes a tail foldable against the cabin section when attached to the aircraft.

8. An aircraft according to claim 1, wherein said detachable cabin section further includes pivotable front elevators for longitudinal control.

* * * * *